US009656697B2

(12) United States Patent
Puscas et al.

(10) Patent No.: US 9,656,697 B2
(45) Date of Patent: May 23, 2017

(54) TAILGATE LATCHING ARCHITECTURE FOR COST AND PERFORMANCE

(71) Applicant: Ford Global Technologies, LLC, Dearborn, MI (US)

(72) Inventors: Livianu Dorin Puscas, Rochester Hills, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/746,260

(22) Filed: Jun. 22, 2015

(65) Prior Publication Data

US 2016/0368543 A1 Dec. 22, 2016

(51) Int. Cl.

| | |
|---|---|
| ***B62D 33/037*** | (2006.01) |
| ***B62D 33/027*** | (2006.01) |
| ***B62D 33/03*** | (2006.01) |
| ***E05C 1/10*** | (2006.01) |
| ***E05C 9/04*** | (2006.01) |
| ***E05C 9/16*** | (2006.01) |

(52) U.S. Cl.

CPC ....... *B62D 33/037* (2013.01); *B62D 33/0273* (2013.01); *B62D 33/03* (2013.01); *E05C 1/10* (2013.01); *E05C 9/042* (2013.01); *E05C 9/043* (2013.01); *E05C 9/16* (2013.01)

(58) Field of Classification Search

CPC .. B62D 33/037; B62D 33/0273; B62D 33/03; E05C 9/043; E05C 9/042; E05C 9/16; E05C 1/10

USPC ........................................... 296/57.1, 59, 60

See application file for complete search history.

(56) References Cited

U.S. PATENT DOCUMENTS

| | | | | |
|---|---|---|---|---|
| 2,829,001 A * | 4/1958 | Leaphart ............ | B62D 33/0273 | 292/DIG. 29 |
| 4,358,150 A | 11/1982 | Nash | | |
| 4,889,378 A * | 12/1989 | Sims .................. | B62D 33/0273 | 296/57.1 |
| 5,052,729 A | 10/1991 | Huber | | |
| 5,280,986 A | 1/1994 | Friesen et al. | | |
| 5,997,067 A | 12/1999 | Shambeau et al. | | |
| 6,030,019 A * | 2/2000 | Stiltner ................ | B62D 33/037 | 292/39 |
| 6,550,838 B2 | 4/2003 | Bobbitt, III et al. | | |
| 6,616,207 B2 * | 9/2003 | Mizuta ................. | B62D 33/037 | 292/DIG. 29 |
| 7,152,892 B2 | 12/2006 | Rechberg | | |
| 7,303,218 B2 | 12/2007 | Kraenzle | | |
| 2001/0038225 A1 | 11/2001 | Muirhead | | |
| 2003/0025348 A1 * | 2/2003 | Bobbitt, III .......... | B62D 33/037 | 296/57.1 |
| 2009/0081012 A1 * | 3/2009 | Hafendorfer ........ | B62D 33/037 | 414/387 |

* cited by examiner

*Primary Examiner* — Jason S Morrow
*Assistant Examiner* — E Turner Hicks
(74) *Attorney, Agent, or Firm* — Jason C. Rogers; Price Heneveld LLP

(57) ABSTRACT

A vehicle includes a cargo box having an opening and opposed apertures on opposite sides of the opening. The vehicle further includes a tailgate having locks retaining a pair of outwardly-biased pins in retracted positions when the tailgate is open. The locks engage the cargo box and release the pins when the tailgate is closed whereby the pins shift outwardly into the apertures when the tailgate is closed. A release lever selectively retracts the pins to permit the tailgate to be opened.

18 Claims, 5 Drawing Sheets

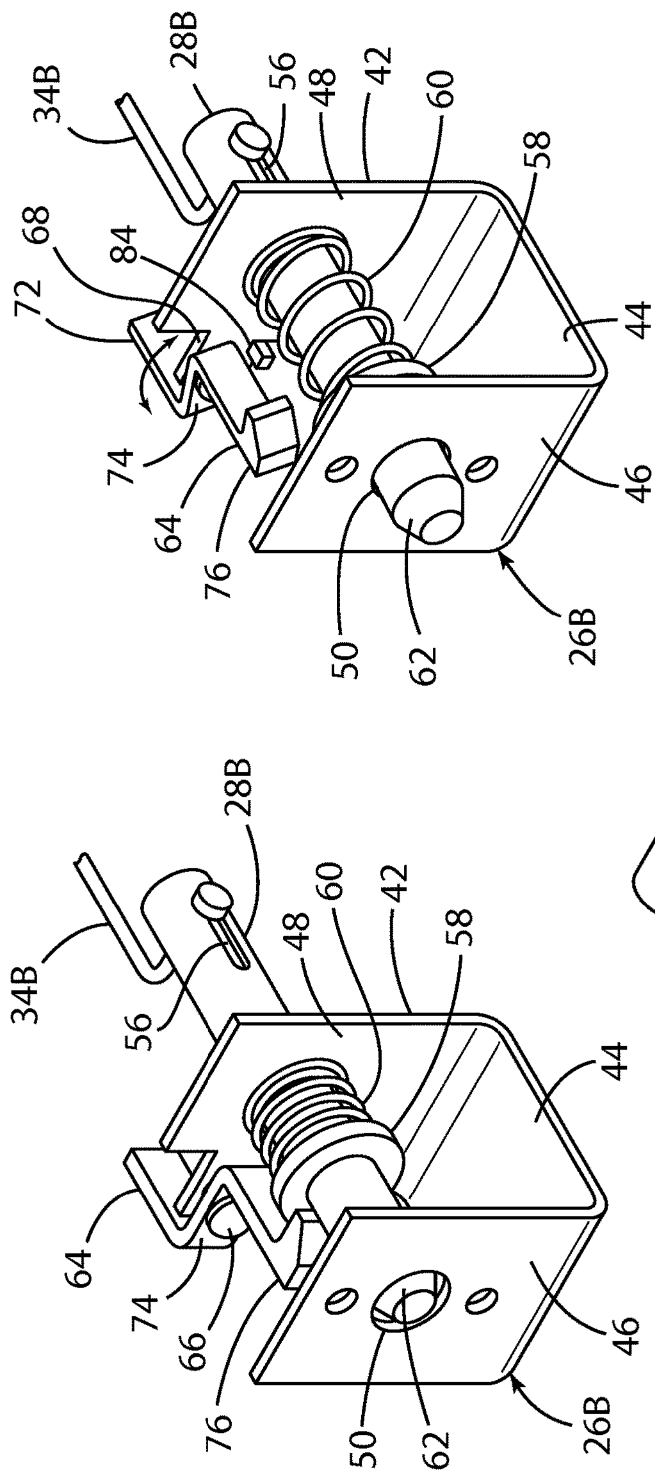
FIG. 6
FIG. 5
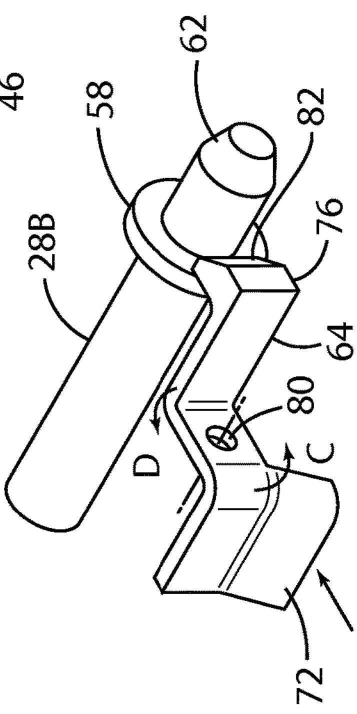
FIG. 7

TAILGATE LATCHING ARCHITECTURE FOR COST AND PERFORMANCE

FIELD OF THE INVENTION

The present invention generally relates to latches, and in particular to a latch for tailgates of pickup trucks.

BACKGROUND OF THE INVENTION

Pickup trucks generally include a bed, and include a tailgate that can be pivoted downwardly to provide access to the bed. Tailgates typically include latching mechanisms that selectively retain the tailgate in a closed or upright position. However, known latches may suffer from various drawbacks.

SUMMARY OF THE INVENTION

One aspect of the present invention is a vehicle assembly including a vehicle cargo box having a horizontal portion and spaced apart upright portions together forming a U-shaped rear opening that provides access to the cargo box. Each upright portion includes a latch opening. The latch openings may be formed by bushings mounted to the upright portions of the cargo box. A tailgate is movably connected to the vehicle for movement between open and closed positions relative to the rear opening. The vehicle assembly further includes a latch system including one or more latches. The system preferably includes first and second latches on the tailgate. The first and second latches are adapted to selectively retain the tailgate in a closed position. The first and second latches each include lock members such as pins that are adapted to shift between extended and retracted positions. The lock members engage the latch openings to retain the tailgate in a closed position when the lock members are in the extended position. The lock members are adapted to shift from the extended positions to the retracted positions to disengage the lock members from the openings and permit the tailgate to be opened. The lock members are biased towards the extended positions. The first and second latches each include a retaining member such as a retaining lever that releasably retains the lock members in the retracted position when the tailgate is in the open position. The retaining members release the lock members when the tailgate is closed whereby the lock members shift to the extended positions and engage the latch openings in the upright portions to retain the tailgate in the closed position.

Another aspect of the present invention is a pickup including a cargo box having an opening and opposed apertures on opposite sides of the opening. The pickup further includes a tailgate having locks or retaining members that retain a pair of outwardly-biased pins in retracted positions when the tailgate is open. The locks engage the cargo box and release the pins when the tailgate is closed whereby the pins shift outwardly into the apertures when the tailgate is closed. A manual or powered release lever or handle selectively retracts the pins to permit the tailgate to be opened.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is an isometric view of a latch mechanism with the lock pin in a retracted position;

FIG. 6 is an isometric view of a latch mechanism with the lock pin in an extended position;

FIG. 7 is a partially fragmentary view of a portion of the latch mechanism showing the lock pin and a retaining lever engaging the lock pin;

DETAILED DESCRIPTION OF THE PREFERRED EMBODIMENTS

Figure 1:
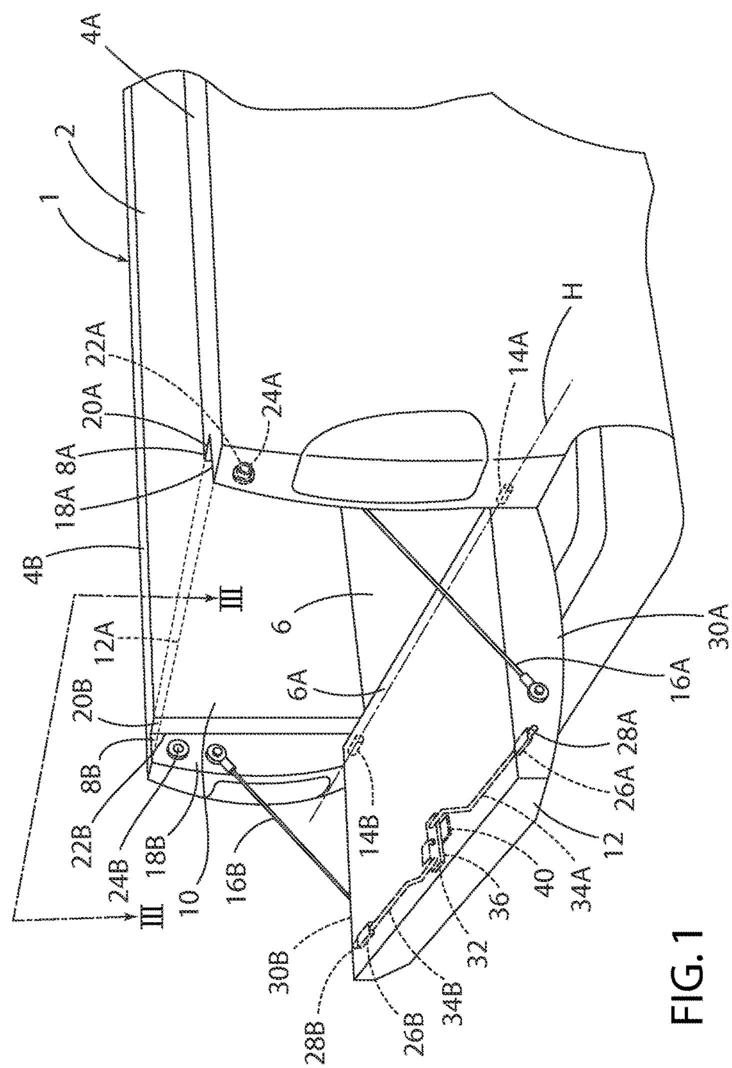
FIG. 1 is a partially fragmentary view of a portion of a pickup truck cargo box and tailgate according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a pickup truck 1 includes a vehicle cargo box or bed 2 formed by upright sidewalls 4A and 4B, and a floor structure 6. The cargo box 2 includes upright portions or structures 8A and 8B that extend upwardly adjacent a rear portion 6A of floor structure 6 to define a U-shaped rear opening 10 that provides access to the cargo box 2. The upright portions or structure 8A and 8B may comprise "D" pillars or other suitable structures. A tailgate 12 is movably mounted or coupled to the vehicle by pivots/hinges 14A and 14B to permit movement (e.g. rotation) of tailgate 12 about a generally horizontal axis "H" between an open position and a closed position. In FIG. 1, the closed position of tailgate 12 is shown by the dashed lines 12A. Hinges 14A and 14B may comprise conventional pivots/hinges of a type that are known in the art. Cables 16A and 16B or other suitable mechanisms may be utilized to support the tailgate 12 when it is in the open position.

The upright portions or structures 8A and 8B are mirror images of one another, and include inwardly facing side surfaces or faces 18A and 18B, respectively (see also FIGS. 3 and 4), and rearwardly facing surfaces or faces 20A and 20B, respectively. The side surfaces/faces 18A and 18B are transversely-oriented relative to the rearwardly-facing surfaces/faces 20A and 20B, respectively. Side faces 18A and 18B preferably form an angle of about 90° relative to side faces 20A and 20B, respectively, in plan view. Also, side faces 18A, 18B, 20A, and 20B are preferably upright (e.g. approximately vertical). It will be understood that one or more of the side faces 18A, 18B, 20A, and 20B are not necessarily precisely vertical, and may also include portions that are not vertical. Bushings 22A and 22B are mounted to the upright portions or structures 8A and 8B, respectively. The bushings 22A and 22B may comprise a suitable material such as polymer, metal. Bushings 22A and 22B form spaced apart latch openings or apertures 24A and 24B, respectively that generally face each other.

Tailgate 12 includes latch mechanisms 26A and 26B which include movable lock members or pins 28A and 28B, respectively. The pins 28A and 28B extend and retract (shift) from opposite edges or sides 30A and 30B, respectively of tailgate 12 and selectively engage the openings 24A and 24B of bushings 22A and 22B, respectively, to thereby selectively retain the tailgate 12 in the closed position 12A. Pins 28A and 28B are preferably linear (straight) and define linear pin axes along which the pins shift. However, it will be understood that pins 28A and/or 28B could be non-linear and/or could move in a non-linear manner. Also, pins 28A and/or 28B could have a non-circular cross-sectional shape and/or a non-uniform cross-sectional size.

Figure 2:
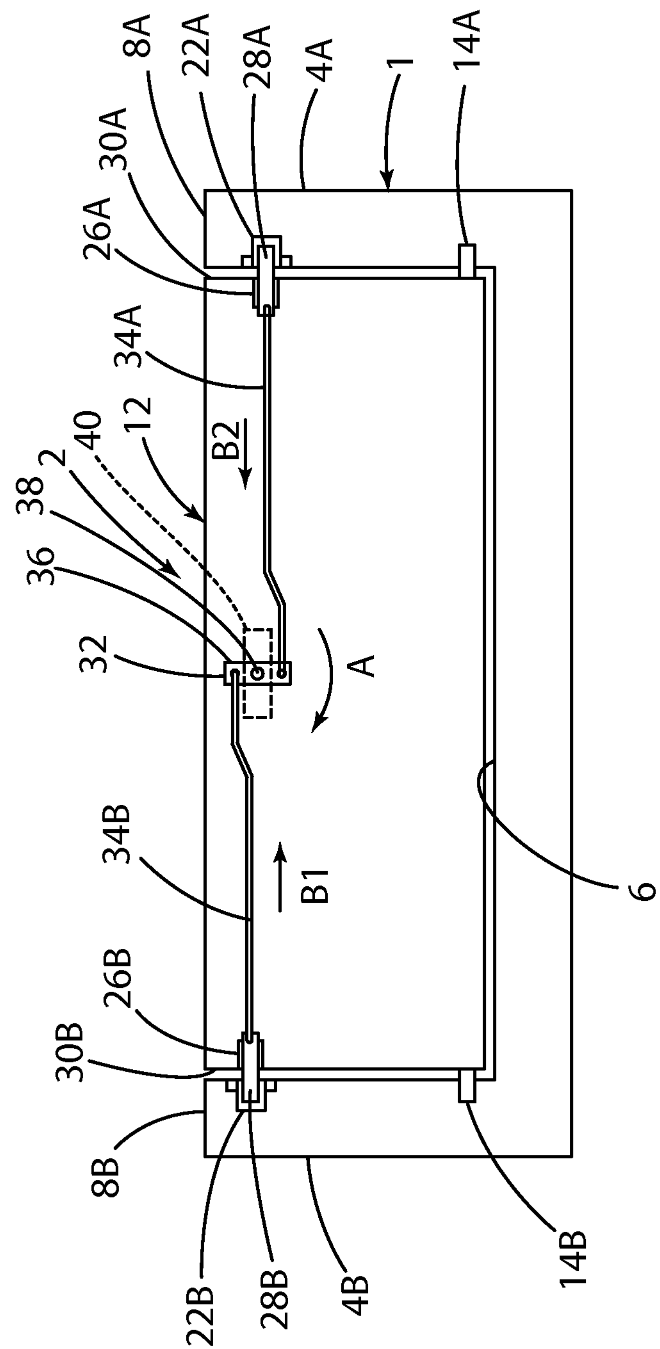
FIG. 2 is a side elevational view of the tailgate and cargo box of FIG. 1.

Tailgate 12 includes a latch release mechanism 32 that is operably connected to the latch mechanisms 26A and 26B by linkages 34A and 34B, respectively, to thereby permit retraction of pins 28A and 28B from extended/latched/engaged configurations or positions to retracted/unlatched/disengaged configurations or positions. Upon retraction of pins 28A and 28B, the pins 28A and 28B disengage the latch openings 24A and 24B to permit the tailgate 12 to be opened (see also FIG. 2). Latch release mechanism 32 may include a bellcrank 36 that pivots about a pivot pin 38 when release handle or lever 40 is pulled outwardly by a user. As bellcrank 36 rotates in the direction of the arrow "A," linkage 34A shifts inwardly as shown by the arrow "B1," and linkage 34B also shifts inwardly as shown by the arrow "B2." Linkages 34A and 34B are connected to the pins 28A and 28B such that inward movement of linkages 34A and 34B shifts the lock pins 28 inwardly, thereby retracting the pins 28A and 28B to disengage the lock pins 28A and 28B from the openings or apertures 24A and 24B, respectively. The latch release mechanism 32 and release handle or lever 40 may be substantially similar to known tailgate release mechanisms utilized for conventional tailgate latches. Alternatively, the latch release mechanism 32 may comprise a powered/remote mechanism as described in U.S. Pat. Nos. 8,532,873 and 8,903,605, the entire contents of which are incorporated by reference. Linkages 34A and 34B may comprise rods, cable, or other suitable links.

Latch mechanism 26A and 26B may be substantially identical to one another, or they may be mirror images of one another. In the illustrated example, latch mechanisms 26A and 26B are mirror images of one another. Accordingly, it will be understood that the following description of latch mechanism 26B also applies to the latch mechanism 26A.

With reference to FIGS. 3-9, latch mechanism 26B includes a bracket 42 having a base wall 44 and a pair of sidewalls 46 and 48 that extend from the base wall 44. Tailgate 12 defines an interior space formed by sidewalls 13A, 13B, and 13C. Bracket 42 is disposed in the interior space of tailgate 12. Sidewall 46 of bracket 42 may be welded or otherwise secured to one or more sidewalls. Pin 28B is slidably supported in openings 50 and 52 in sidewalls 46 and 48, respectively. Linkage 34B may include a transverse end portion 54 that is received in a slot 56 of lock pin 28B to thereby provide a lost motion connection between linkage 34B and lock pin 28B. It will be understood that the linkages 34A and 34B may have a variety of configurations, and may connect to the lock pin 28B in various ways as may be required for a particular application. Also, bracket 42 may have a variety of configurations, and the present invention is not limited to the specific configuration described in detail herein.

Figures 3, 4:
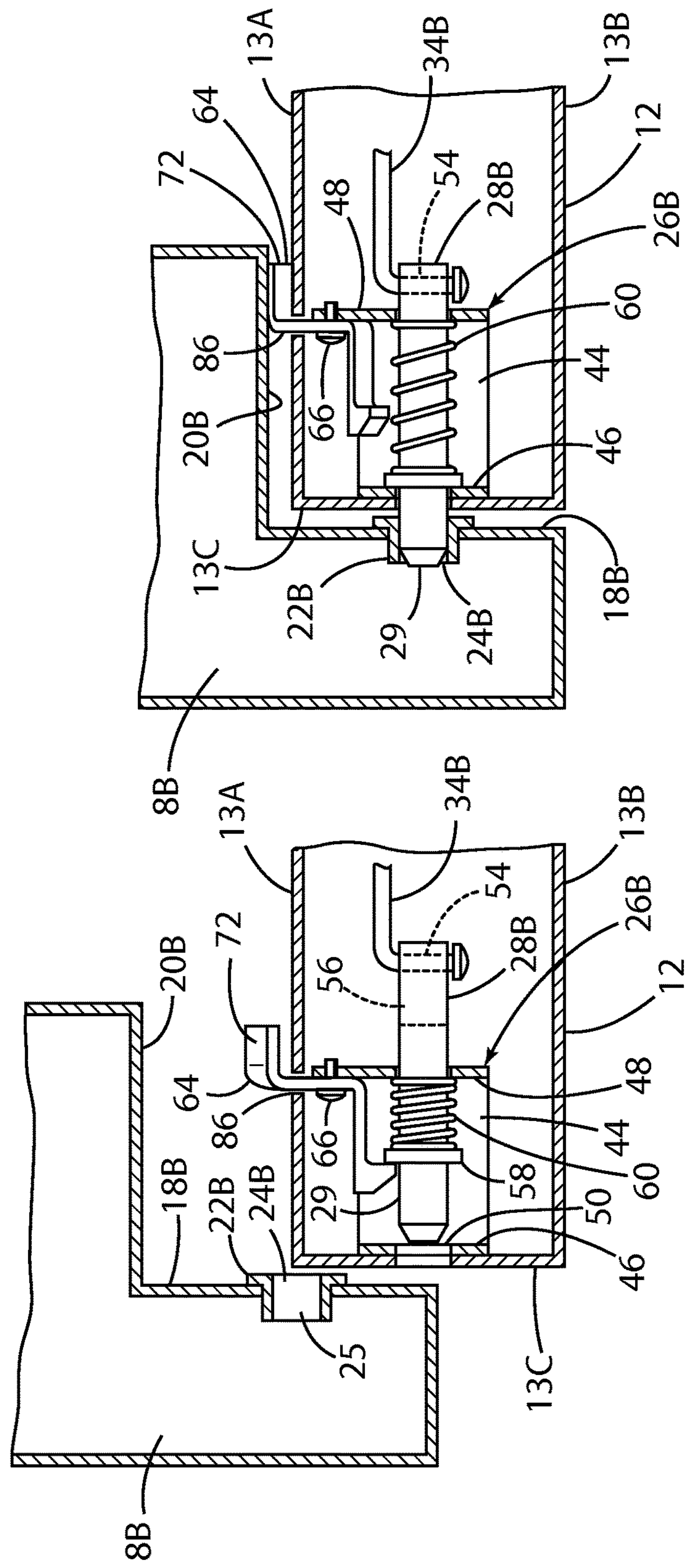
FIG. 3 is a fragmentary cross sectional view of a portion of a latch mechanism showing a lock pin in a refracted position to permit the tailgate to be opened.
FIG. 4 is a fragmentary cross sectional view of the latch mechanism of FIG. 3 showing the lock pin in an extended position to retain the tailgate in a closed position.
Figure 8:
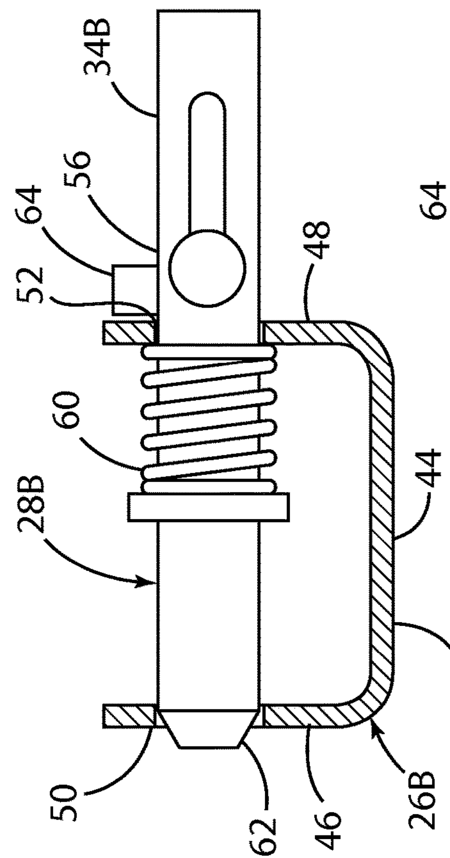
FIG. 8 is a cross sectional view of the latch member showing the pin in a retracted position.

A coil spring 60 is disposed on lock pin 28B, and extends between a collar 58 of lock pin 28B and sidewall 48 of bracket 42. Coil spring 60 comprises a compression spring and biases the pin 28B from the retracted position (FIG. 3) to the extended position (FIG. 4). Pin 28B preferably includes a tapered end portion 62 that facilitates insertion of pin 28B into opening 24B of bushing 22B in the event pin 28B is not exactly aligned with opening 24B as pin 28B is shifted to the extended position.

Figure 9:
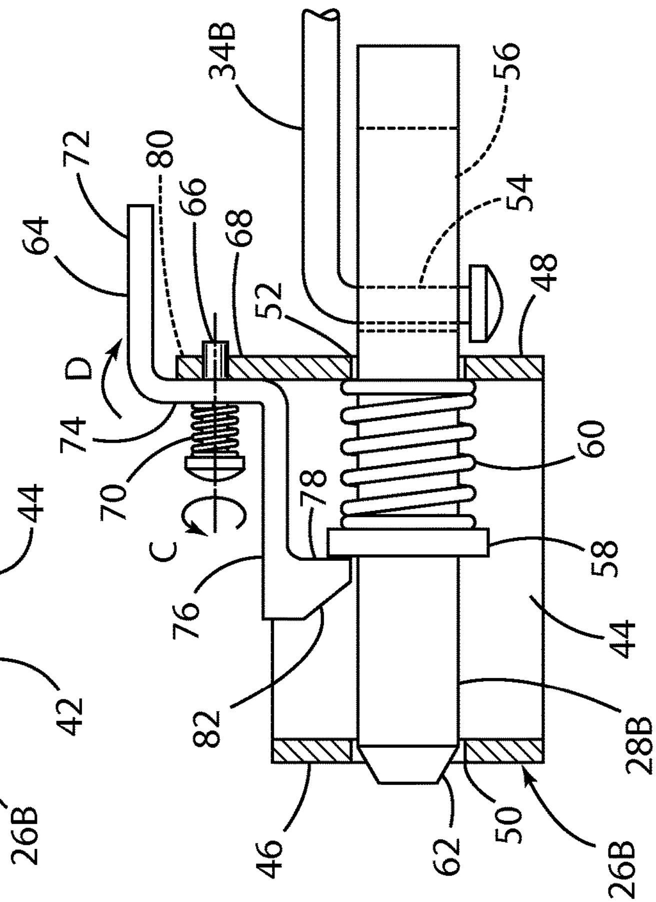
FIG. 9 is a cross sectional view of the latch member showing the pin in a retracted position.

Latch mechanism 26B includes a retaining lever 64 that selectively retains the lock pin 28B in the retracted position (FIG. 3). Retaining lever 64 is rotatably mounted to an extension or tab 68 of side wall 48 by a pin 66. A torsion spring 70 rotatably biases the retaining lever 64 to the engaged position (FIG. 3). Retaining lever 64 includes an outer end 72 that extends outwardly from a transverse central portion 74 through an opening 86 in sidewall 13A of tailgate 12, and an inner end 76 that extends from central portion 74 in a direction opposite outer end 72 (see also FIG. 9). Inner end 76 of retaining lever 64 includes a transverse retaining surface 78 (FIG. 9) that selectively engages collar 58 of lock pin 28B to retain the lock pin 28B in the retracted position (FIGS. 3 and 9). Retaining lever 64 may include an opening 80 (FIG. 7) through transverse central portion 74 that receives pin 66. Opening 80 may be oversized (i.e. have a diameter that is significantly larger than the diameter of pin 66) to thereby permit rotation of retaining lever 64 as shown by the arrow "D" (FIG. 9) about a vertical axis in addition to rotation of retaining lever 64 about the horizontal axis of pin 66 as shown by the arrow "C." Retaining lever 64 may include a tapered or chamfered surface 82 that is configured to engage collar 58 of lock pin 28B as lock pin 28B shifts from the extended position (FIG. 4) to the retracted position (FIG. 3). Engagement of chamfered surface 82 with collar 58 causes rotation of retaining lever 64 as shown by the arrow D (FIG. 9). It will be understood that the chamfered surface 82 is optional, and opening 80 may have a diameter that is only slightly larger than the diameter of pin 66, in which case retaining lever 64 cannot rotate as shown by the arrow D.

Torsion spring 70 biases retaining lever 64 from the released configuration (FIG. 6) towards the engaged configuration (FIG. 5). A stop 84 (FIG. 6) may be disposed on sidewall 48. Stop 84 limits rotation of retaining lever 64 such that the retaining lever 64 cannot rotate past the engaged configuration of FIG. 5.

In use, when tailgate 12 is in a closed position (FIG. 4), lock pin 28B is extended into opening 24B of bushing 22B. When lock pin 28B is in the extended configuration, tailgate 12 is retained in a closed position. Also, when tailgate 12 is in the closed position of FIG. 4, outer end 72 of retaining lever 64 contacts face or surface 20D, thereby rotating the retaining lever 64 to the disengaged configuration of FIGS. 4 and 6. To open the tailgate 12, a user pulls outwardly on release handle or lever 40 (FIGS. 1 and 2), thereby rotating bellcrank 36. Rotation of bellcrank 36 shifts linkages 34A and 34B inwardly, thereby shifting the lock pin 28B from the extended configuration (FIG. 4) towards the retracted configuration (FIG. 3). The tailgate 12 can then be moved towards the open position. Outward movement of the tailgate 12 away from the fully closed position (FIG. 4) causes the outer end 72 of retaining lever 64 to disengage from surface 20B, and torsion spring 70 then causes retaining lever 64 to rotate to the engaged configuration of FIG. 3 to retain the lock pin 28B in the retracted position of FIG. 3.

To close tailgate 12, a user swings the tailgate 12 upwardly from the open position 12 (FIG. 1) to the closed position 12A. As the tailgate 12 closes, outer end 72 of retaining lever 64 contacts/engages surface 20B (FIG. 4), thereby rotating the retaining lever 64 from the engaged configuration (FIG. 3) to the released configuration (FIG. 4). Coil spring 60 then causes lock pin 28B to shift from the retracted configuration (FIG. 3) to the extended configuration (FIG. 4) to thereby engage the opening 24B and retain the tailgate 12 in the closed position. It will be understood that as tailgate 12 is opened or closed latch mechanisms 26A and 26B operate substantially simultaneously in a substantially identical manner.

The locking pins 28A and 28B eliminate various disadvantages associated with conventional tailgate latch mechanisms. For example, latch openings or apertures 24A and 24B may have a cylindrical inner surface 25 (FIG. 3) that is slightly larger than the cylindrical outer surfaces 29 of lock pins 28A and 28B, such that the pins 28A and 28B are closely supported/engaged around the entire 360 degree circumference of the pins 28A and 28B. For example, the latch openings 24A and 24B may have a diameter that is 0.010-0.050 greater than the diameter of outer surfaces 29 of lock pins 28A and 28B. This provides a relatively close fit that limits movement of tailgate 12 relative to the upright portions 8A and 8B of cargo box 2 of pickup truck 1 when tailgate 12 is in the closed position 12A (FIG. 1). This reduces or eliminates squeaks and rattles that may occur in conventional tailgate latch mechanisms. Furthermore, the latch mechanism of the present invention has fewer components than conventional tailgate latch mechanisms. Still further, the tailgate latch of the present invention provides the same closing effort under all temperature conditions. Also, the latch of the present invention does not suffer from decreased performance due to changes in the resiliency of over slam bumpers of the type utilized in conventional tailgate latch configurations. Specifically, the tailgate latch of the present invention stops motion of tailgate 12 due to engagement of pins 28A and 28B in openings 24A and 24B. Thus, over slam bumpers are not required. Nevertheless, it will be understood that over slam bumpers (e.g. resilient pads) (not shown) could be positioned on side faces 18A and 18B and/or on side faces 20A and 20B to assist in stopping tailgate 12 as it is closed and/or to laterally support/position tailgate 12 relative to upright structures 8A and 8B.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle assembly comprising:

a vehicle cargo box having a U-shaped rear opening:

a tailgate movably coupled to the vehicle cargo box for movement between open and closed positions relative to the rear opening;

a latch system including first and second latches adapted to selectively retain the tailgate in a closed position;

first and second bushings having openings, wherein the first and second bushings are mounted to the vehicle cargo box whereby the openings are located adjacent opposite edges of the tailgate when the tailgate is in its closed position;

and wherein the first and second latches each include lock pins that are adapted to shift from retracted positions to extended positions in which the lock pins engage the openings in the bushings to retain the tailgate in a closed position, and wherein the lock pins are adapted to shift from the extended positions to the retracted positions to disengage the lock pins from the openings and permit the tailgate to be opened, and wherein the lock pins are biased towards the extended positions, and wherein the first and second latches each include retaining members that releasably retain the lock pins in their retracted positions when the tailgate is in its open position, and wherein the retaining members release the lock pins when the tailgate is closed whereby the lock pins shift to their extended positions and engage the openings in the bushings to retain the tailgate in its closed position, wherein the retaining members move between engaged positions in which the retaining members retain the lock pins in their retracted positions, and released positions in which the retaining members permit movement of the lock pins from their retracted positions to their extended positions, and wherein the retaining members are biased towards their engaged positions.

2. The vehicle assembly of claim 1, wherein:

the lock pins define pin axes and shift linearly along the pin axes between the extended and retracted positions.

3. The vehicle assembly of claim 1, wherein:

the retaining members operably engage the vehicle cargo box to retain the retaining members in their released positions when the tailgate is in its closed position.

4. The vehicle assembly of claim 3, wherein:

the retaining members are rotatably mounted to the tailgate.

5. The vehicle assembly of claim 4, wherein:

the retaining members include extensions that protrude outwardly from the tailgate and engage the vehicle cargo box when the tailgate is in a closed position to retain the retaining members in their released positions.

6. The vehicle assembly of claim 5, including:

coil springs biasing the lock pins towards their extended positions; and torsion springs rotatably biasing the retaining members towards their engaged positions.

7. The vehicle assembly of claim 6, including:

a release member movably mounted to a central portion of the tailgate;

linkages interconnecting the release member and the lock pins such that movement of the release member in a first direction shifts the lock pins from their extended positions to their retracted positions whereby the lock pins disengage from the openings in the bushings upon movement of the release member in the first direction.

8. The vehicle assembly of claim 7, including:

an outside release lever operably connected to the release member, the outside release lever being movably mounted on an outer side of the tailgate whereby outward movement of the outside release lever moves the release member in the first direction to disengage the lock pins from the bushings.

9. The vehicle assembly of claim 7, including:

a powered actuator operably connected to the release member to shift the release member the first direction upon actuation of the powered actuator.

10. The vehicle assembly of claim 7, wherein:

the openings in the bushings are defined by cylindrical inner surfaces formed in the bushings.

11. The vehicle assembly of claim 10, wherein:

the lock pins have end portions comprising cylindrical outer surfaces and tapered tip portions adjacent the cylindrical outer surfaces.

12. The vehicle assembly of claim 2, wherein:

the retaining members are rotatably mounted to the tailgate and rotate about axes that are parallel to axes of the lock pins.

13. The vehicle assembly of claim 1, wherein:

the vehicle cargo box includes spaced apart upright structures defining a spaced apart vertical side of the U-shaped rear opening, the upright structures having rearwardly-facing rear faces and inwardly-facing inner faces adjacent the rear faces, and wherein the bushings are located on the inner faces, and wherein the tailgate includes outwardly-facing opposite side faces that are positioned directly adjacent the inner faces when the tailgate is in its closed position.

14. The vehicle assembly of claim 13, wherein:

the retaining members engage at least one of the rear faces and the inner faces when the tailgate is in its closed position to cause the retaining members to release the lock pins when the tailgate is in its closed position.

15. A pickup comprising:

a cargo box having an opening and opposed apertures near the opening;

a tailgate including locks retaining a pair of outwardly-biased pins in retracted positions when the tailgate is opened, the locks engaging the cargo box, causing the locks to automatically release the pins when the tailgate is closed whereby the pins shift outwardly into the apertures when the tailgate is closed, and:

a lever selectively retracting the pins.

16. A pickup comprising:

a cargo box having an opening and opposed apertures near the opening;

a tailgate including locks that retain a pair of outwardly-biased pins in retracted positions when the tailgate is opened, the locks engaging the cargo box and releasing the pins when the tailgate is closed whereby the pins shift outwardly from the tailgate into the apertures when the tailgate is closed, a lever selectively retracting the pins; and wherein:

the locks are pivotably mounted to the tailgate and include extensions that contact the cargo box when the tailgate is closed to retain the locks in disengaged positions in which the locks permit the pins to shift outwardly into the apertures.

17. The pickup of claim 16, wherein:

the locks are rotatably biased towards engaged positions in which the locks engage the pins and retain the pins in retracted positions in which the pins cannot engage the apertures.

18. The pickup of claim 16, wherein:

the pins are movably mounted to the tailgate and shift linearly along a straight line between retracted and extended positions.

* * * * *